United States Patent
Fischer et al.

(10) Patent No.: US 6,909,954 B2
(45) Date of Patent: Jun. 21, 2005

(54) MECHATRONIC TRANSMISSION ARRANGEMENT FOR MOTOR VEHICLES

(75) Inventors: Georg Fischer, Regensburg (DE); Christoph Lincke, Regensburg (DE); Josef Loibl, Bad Abbach (DE); Ulf Scheuerer, Hagelstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/652,942

(22) Filed: Aug. 29, 2003

(65) Prior Publication Data

US 2004/0073349 A1 Apr. 15, 2004

Related U.S. Application Data

(63) Continuation of application No. PCT/DE02/00506, filed on Feb. 12, 2002.

(30) Foreign Application Priority Data

Mar. 2, 2001 (DE) .......................................... 101 10 257

(51) Int. Cl.$^7$ ................................................ G06F 7/00
(52) U.S. Cl. ........................................... 701/51; 477/34
(58) Field of Search .................... 701/51–52; 74/606 R; 137/884, 270; 477/34–35, 78

(56) References Cited

U.S. PATENT DOCUMENTS

| 6,612,202 | B2 | * | 9/2003 | Thorum et al. | ........... 74/606 R |
| 6,616,486 | B2 | * | 9/2003 | Loibl et al. | ............... 439/660 |
| 2001/0005048 | A1 | * | 6/2001 | Krause et al. | ............. 257/691 |
| 2002/0073538 | A1 | * | 6/2002 | Thorum | ...................... 29/832 |

FOREIGN PATENT DOCUMENTS

| DE | 198 21 897 A1 | 11/1998 | ........... F16H/63/00 |
| DE | 198 26 588 C1 | 11/1999 | ............. H05K/5/02 |
| DE | 199 55 603 C1 | 2/2001 | ........... F16H/59/02 |
| JP | 06294461 | 10/1994 | ........... F16H/59/68 |
| WO | WO01/13011 A1 | 2/2001 | ........... F16H/59/10 |

* cited by examiner

Primary Examiner—Gertrude A. Jeanglaude
(74) Attorney, Agent, or Firm—Baker Botts L.L.P.

(57) ABSTRACT

A mechatronic transmission arrangement for motor vehicles that comprises a transmission housing (1) is disclosed including a mechatronic component (2), and a sensor arrangement (4) accommodated therein. The latter is mounted in a manner that permits its position to change with regard to the mechatronic housing (3). A position adjusting device (13) operates between the sensor arrangement (4) and the transmission housing (1) while passing through the mechatronic housing (3). After adjusting, the sensor arrangement (4) can be fixed by means of a fixing device (18).

6 Claims, 2 Drawing Sheets

MECHATRONIC TRANSMISSION ARRANGEMENT FOR MOTOR VEHICLES

CROSS REFERENCE TO RELATED APPLICATION

This application is a continuation of copending International Application No. PCT/DE02/00506 filed Feb. 12, 2002 and claiming a priority date of Mar. 2, 2001, which designates the United States.

TECHNICAL FIELD OF THE INVENTION

The invention relates to a mechatronic transmission arrangement for motor vehicles.

BACKGROUND OF THE INVENTION

As background of the invention it must be recorded that in modern designs of motor vehicle automatic transmissions, the electronic components for transmission control are increasingly integrated into the transmission. The motivation for this is the higher reliability and lower costs of this type of design which is based on doing away with electrical and mechanical connections.

The previous normal design for automatic transmissions included the actuators such as the electro hydraulic pressure control and the sensors e.g. for recording the rotational speed, pressure, position of the selector lever, temperature of the transmission oil etc., in or on the transmission, where they were fitted separately from each other. The electronic control of the transmission installed outside and away from the transmission was then connected to the actuators and sensors via cables and connectors. Therefore, costly individual couplings were made between the inputs and outputs of the control and the corresponding actuators and sensors.

In the case of a mechatronic transmission arrangement, the actual electronic control that as a rule includes a microcontroller and a corresponding memory, and the sensors for recording actual conditions and parameters of the transmission are fitted jointly in a housing. This mechatronic component is then mounted in the transmission casing when the transmission is assembled, whereby the above-mentioned connection work between the sensors and the transmission arrangement is omitted. In an especially simple way in terms of manufacturing and in an especially robust way in terms of assembly, the electronic components of the transmission arrangement, on the one hand and the sensors on the other hand can be arranged with their wiring to the transmission control on a common printed circuit board in the mechatronic component.

Usually at least one position sensor is now located in the mechatronic component which serves to determine the position of a specific transmission part. Therefore, it is for example of the utmost importance for the reliable and failure-free operation of a transmission, that, by means of a sensor, the position of a relocatable transmission part such as the selector lever manually actuated by the driver or the hydraulic manual switch valve of the transmission is determined exactly. As a result, the positioning of the sensor relative to the transmission is decisive for the accuracy of determining the position. These problems arise equally in sensors in either a rotary or a linear alignment. Even for sensors, for example, for recording the rotational speed of the transmission, an accurate positioning of the sensor relative to the transmission mechanics is important for safe and reliable functioning.

Previously the sensors were adjusted in non-mechatronic arrangements via their mounting points (as a rule) on the transmission casing. It was then also necessary to adjust all the sensors individually and separately from one another in their positions, which of course involved a considerable amount of work. Therefore, only the position sensors had to be adjusted individually for recording the driving mode set on the transmission by detecting the corresponding position of the manually actuated selector lever after each fitting to the transmission in such a way that the electrical output signal of the sensors corresponds to the mechanically set driving mode in each case.

SUMMARY OF THE INVENTION

The object of the invention is now to develop a mechatronic transmission arrangement in such a way that it is possible to accommodate an exact, but nevertheless practically executable position adjustment of the sensor arrangement(s) in the mechatronic component.

This object can be achieved by a mechatronic transmission arrangement for motor vehicles comprising a transmission casing for a motor vehicle transmission, a mechatronic component with a mechatronic housing mountable on the transmission casing, a sensor arrangement with one or several sensors accommodated in a mechatronic component that can be positioned relative to a transmission component to be monitored, a flexible mounting of the sensor arrangement in the mechatronic housing, a position adjusting device that operates between the sensor arrangement and the transmission casing while passing through the mechatronic housing, and a fixing device for fixing the sensor arrangement in the mechatronic housing in its position adjusted relative to the transmission casing.

The sensor arrangement can be connected to a control circuit of the mechatronic via a flexible printed circuit board. The transmission arrangement may further comprise a mounting of the sensor arrangement that allow for a flexible positioning and act upon clamping elements at the mechatronic housing. At least one centering pin on the sensor arrangement can be provided that passes through an opening in the mechatronic housing penetrating a corresponding adjusting opening in the transmission casing. At least one centering pin can be provided at the transmission casing, that passes through an opening in the mechatronic housing and engages in a corresponding adjusting opening in the sensor arrangement. Screw eyes can be provided on the sensor housing, that engage with adjustment play with the screw bolts that can be connected with the mechatronic housing.

This provides for flexibility in the support of at least one sensor arrangement in the mechatronic housing. This means that the individual sensors on their own or in one or more groups are supported so that they can be jointly moved relative to the mechatronic housing. For an exact position adjustment, a corresponding position adjusting device is provided that operates between the sensor arrangement and the transmission casing while penetrating the mechatronic housing. These position adjusting devices preferably involve mechanically operating centering pins, locating pins, spigots or the like in the sensor arrangement or in the transmission casing that engage with a corresponding adjusting opening in the transmission casing or the sensor arrangement. Finally, a fixing device is provided that defines the sensor arrangement in the mechatronic housing in its position adjusted relative to the transmission casing.

As a result of this design, there is a quasi "automatic" adjustment of the sensor arrangement or the specific sensors compared with the monitored components so that the actual adjusting costs are reduced considerably. The desired position of the sensors within the mechatronic housing is then permanently fixed by the flexible mounting and subsequent fixing of the sensor arrangement.

BRIEF DESCRIPTION OF THE DRAWINGS

Further preferred embodiments of the invention are produced by the subclaims. Details and advantages thereof can be taken from the following description and are described in greater detail in the embodiments of the object of the invention based on the accompanying drawings. The drawings show:

DETAILED DESCRIPTION OF THE PREFERRED EMBODIMENTS

Figure 1:
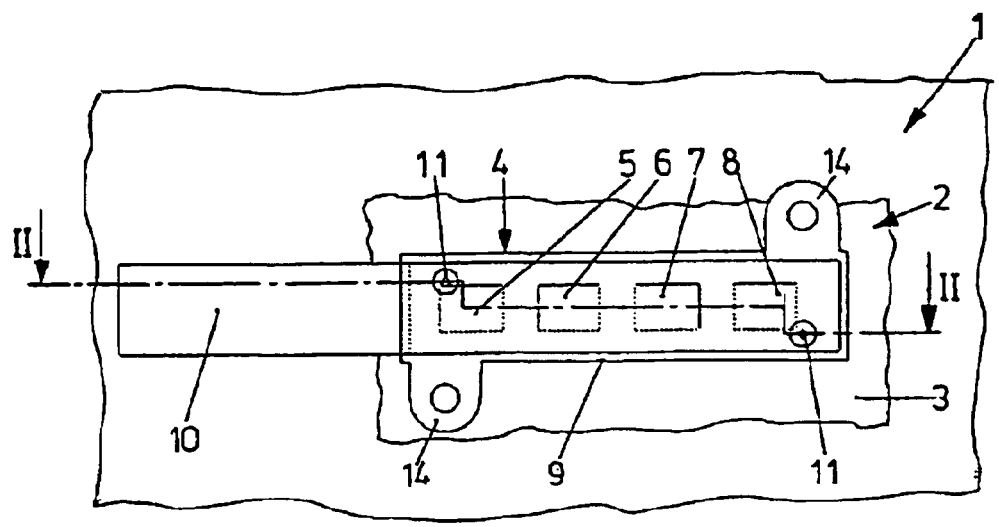
FIG. 1 A sectional view from above of a mechatronic transmission arrangement in an initial form of embodiment, FIG. 2 A section through a transmission arrangement along the line of intersection II—II according to FIG. 1, FIG. 3 A sectional view from above of a mechatronic transmission arrangement in a second embodiment, as well as FIG. 4 and 5 Detail sections of the transmission arrangement along the lines of intersection IV—IV or V—V according to FIG. 3.
Figure 2:
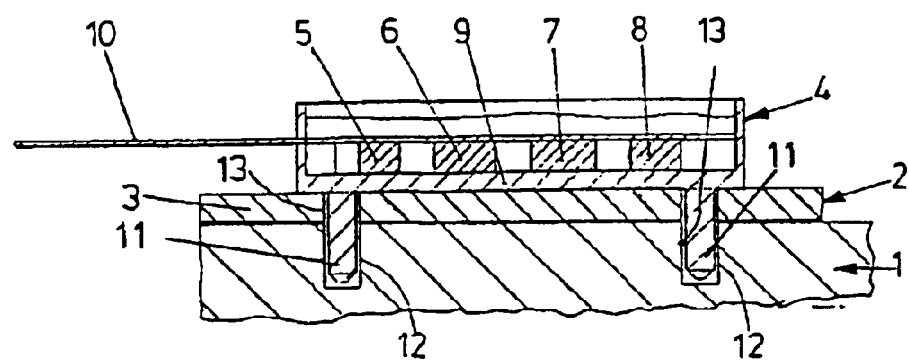

As is clear from FIGS. 1 and 2, the mechatronic transmission arrangement includes a transmission casing 1 which, for example, can be a so-called "hydraulic plate" of an automatic transmission. On the transmission casing 1, a mechatronic component 2 is mounted by fixing elements not shown in greater detail, that accommodates in its mechatronic housing 3 a microprocessor-based electronic control not shown in greater detail and a sensor arrangement 4 with a number of sensors 5, 6, 7, 8 arranged consecutively in a line. The sensor arrangement 4 then features a housing 9, in which the sensors 5 to 8 are fitted in stable positions. The electronic measurement connection of sensors 5, 6, 7, 8 to the control of the mechatronic component 2 not shown in greater detail is effected via a strip-shaped, flexible printed circuit board 10 on which, not shown in greater detail, the electrical conductor paths to sensors 5 to 8 are accommodated in the usual manner.

Figure 3:
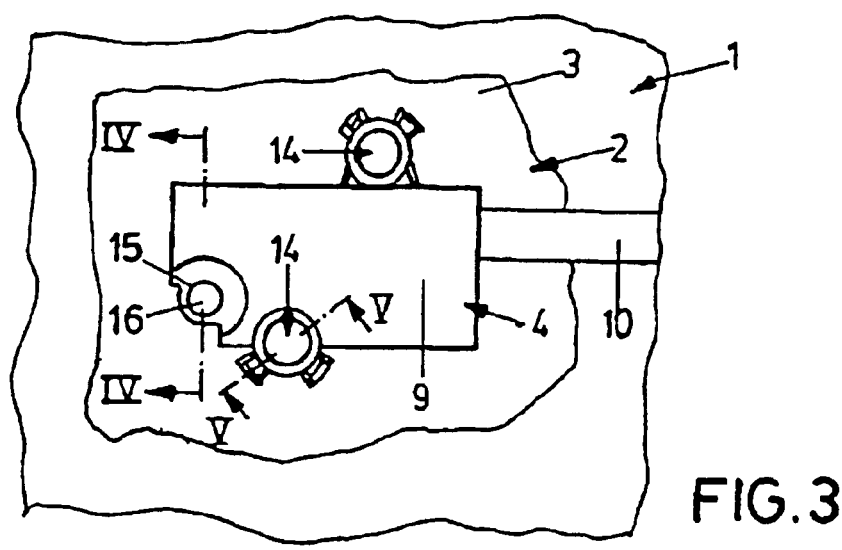
Figure 4:
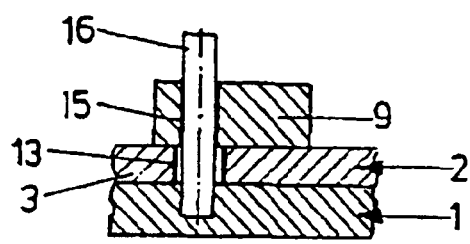

As can especially be seen in FIG. 2, the sensor housing 9 features on its side facing the transmission casing 1, two one-piece centering pins 11, that jointly with corresponding precise-fit adjusting openings 12 in the transmission casing 1 form a position adjusting arrangement as a whole designated with 13. The centering pins 11 then pass through the mechatronic housing 3 via penetration openings 13 that are considerably larger than their outer contour. Because of the penetration of centering pins 11 in the adjusting openings 12, the position of sensors 5 to 8 compared with the transmission is determined exactly, in which case the sensor housing 9 can move flexibly in its position relative to the mechatronic housing 3. After adjustment, as shown in FIG. 2, the sensor arrangement 4 in the adjusted position in the mechatronic housing 3 is then determined via the screw eyes 14 in the sensor housing 9. Furthermore, the designs of the screw eyes 14 must be explained on the basis of the embodiments according to FIGS. 3 to 5 to which reference is made.

Figure 5:
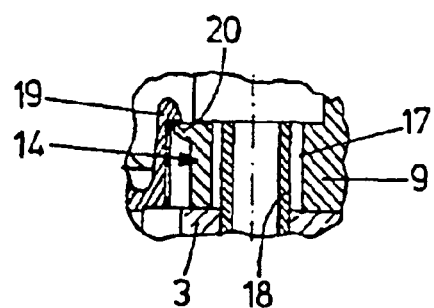

With this second embodiment a transmission casing 1 is again provided in which there is a mechatronic component 2 containing a sensor arrangement 4. In this case, a centering bore 15 is provided in the sensor housing through which a locating pin 16 anchored in the transmission casing 1 penetrates. The latter again passes through a corresponding penetration opening 13 in mechatronic housing 3, as can clearly be seen in FIG. 4. On the basis of the mutual position determination between the sensor arrangement 4 and the transmission casing 1 with the help of the centering bore 15 and the locating pin 16, the positions of the sensors integrated in the sensor arrangement (not shown in FIGS. 3 to 5) can again be determined accurately. Sensor housing 9 is roughly fixed in the mechatronic housing 3 by the flexible support with the help of the screw eyes 14 (FIG. 5). In addition, the screw eyes 14 protruding from the sides of sensor housing 9 and formed in one piece with it, have eyes 17 that have a clearly larger inside diameter than the female thread sleeve 18 fixed in the mechatronic housing. In addition, catch hooks 19 are made in one piece with the mechatronic housing 3, the corresponding protrusions 20 at the screw eyes 14 overlap and therefore guarantee a provisional fixing of the sensor arrangement 4 in the mechatronic housing 3. However, the mutual penetration of catch hook 19 and the screw eyes 14 is designed in such a way that there is side play. Through this the sensor housing 9 can move relative to the mechatronic housing 3 during the adjustment with the help of the centering bore 15 and locating pin 16. After successful adjustment, a fixing screw that is not shown is screwed into the female thread sleeve 18 that permanently fixes the screw eye and also the sensor arrangement 4 and in the adjusted position in the mechatronic housing 3.

For the flexible positioning of the sensor arrangement 4 relative to the control seated in the mechatronic housing 3, a flexible printed circuit board 10 is again provided for connecting the sensors.

What is claimed is:

1. A mechatronic transmission arrangement for motor vehicles comprising a transmission casing for a motor vehicle transmission, a mechatronic component with a mechatronic housing mountable on the transmission casing, a sensor arrangement housing with one or several sensors accommodated therein, an adjustable mount for the sensor arrangement housing in the mechatronic housing, the mount operable to allow movement of the sensor arrangement housing relative to the mechatronic housing, a position adjusting device operable between the sensor arrangement housing and the transmission casing while passing through the mechatronic housing, and a fixing device for fixing the sensor arrangement housing in the housing mechatronic housing in its adjusted position relative to the transmission casing.

2. The transmission arrangement according to claim 1, wherein the sensor arrangement is connected to a control circuit of the mechatronic via a flexible printed circuit board.

3. The transmission arrangement according to claim 1, comprising a mounting of the sensor arrangement that allow for a flexible positioning and act upon clamping elements at the mechatronic housing.

4. The transmission arrangement according to claim 1, wherein at least one centering pin on the sensor arrangement is provided that passes through an opening in the mechatronic housing penetrating a corresponding adjusting opening in the transmission casing.

5. The transmission arrangement according to claim 1, wherein at least one centering pin is provided at the transmission casing, that passes through an opening in the mechatronic housing and engages in a corresponding adjusting opening in the sensor arrangement.

6. The transmission arrangement according to claim 1, wherein screw eyes are provided on the sensor arrangement housing, that engage with adjustment play with the screw bolts that can be connected with the mechatronic housing.

* * * * *